United States Patent [19]

Pence et al.

[11] Patent Number: 5,157,057
[45] Date of Patent: Oct. 20, 1992

[54] RIM COMPOSITIONS USING AMINO ACID SALT CATALYSTS

[75] Inventors: Maureen T. Pence, Pottstown; Kenneth G. McDaniel, West Chester, both of Pa.

[73] Assignee: ARCO Chemical Technology, L.P., Wilmington, Del.

[21] Appl. No.: 738,081

[22] Filed: Jul. 30, 1991

[51] Int. Cl.$^5$ ............................................. C08G 18/14
[52] U.S. Cl. ......................................... 521/118; 528/49; 264/51; 264/328.1; 264/328.6; 264/328.8
[58] Field of Search .......................... 521/118; 528/49; 264/51, 328.1, 328.6, 328.8

[56] References Cited

U.S. PATENT DOCUMENTS

| | | | |
|---|---|---|---|
| 3,010,963 | 11/1961 | Erner | 260/268 |
| 3,580,868 | 5/1971 | Diehr et al. | 260/2.5 |
| 3,896,052 | 7/1975 | Lockwood et al. (I) | 252/431 C |
| 3,903,018 | 9/1975 | Kolakowski et al. (I) | 252/431 C |
| 3,986,991 | 10/1976 | Kolakowski et al. (II) | 260/2.5 AW |
| 4,011,180 | 3/1977 | Lockwood et al. (II) | 260/2.5 AW |
| 4,101,465 | 7/1978 | Lockwood et al. (III) | 521/118 |
| 4,709,002 | 11/1987 | Younes (I) | 528/53 |
| 4,731,427 | 3/1988 | Younes (II) | 528/53 |
| 4,757,123 | 7/1988 | Younes (III) | 528/53 |
| 4,800,058 | 1/1989 | Younes (IV) | 264/328.4 |
| 4,879,164 | 11/1989 | Younes (V) | 428/209 |
| 4,886,700 | 12/1989 | Younes (VI) | 428/252 |
| 4,965,038 | 10/1990 | Younes (VII) | 264/552 |

OTHER PUBLICATIONS

Y. Imai, et al., "Trimerization Catalysts for Isocyanurate Foams," *European Journal of Cellular Plastics*, Oct. 1980, pp. 126–133.
U. E. Younes, "Resins Resist Impact: Versatile SRIM Composites," *Urethanes Technology*, Jun./Jul. 1990, pp. 20–23.
ARCO Chemical Company, "ARSET TM HI 2801 High Impact Resin System," Technical Data, brochure, 1990.

*Primary Examiner*—Maurice J. Welsh
*Attorney, Agent, or Firm*—David L. Mossman; Stephen D. Harper

[57] ABSTRACT

Reaction injection molded (RIM) or structural RIM (SRIM) resins having improved (prolonged) set times, that is, reduced reactivity, may be produced by the addition of an acid blocked amino acid salt catalyst as co-catalyst, or even as a sole catalyst. This permits large molds to be filled completely before cure. However, cure rates are not affected permitting high production rates. The physical properties of RIM and SRIM compositions do not suffer from the addition of these co-catalysts. The amino acid salts may have the formula:

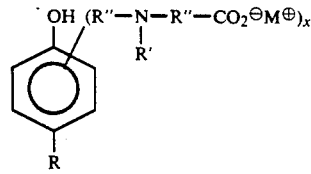

where R and R' are independently selected from the group consisting of hydrogen and alkyl having 1 to 12 carbon atoms; where the R" groups are independently alkylene groups having from 1 to 4 carbon atoms; where M is an alkali metal; and where x ranges from 1 to 4.

28 Claims, No Drawings

RIM COMPOSITIONS USING AMINO ACID SALT CATALYSTS

FIELD OF THE INVENTION

The invention relates to reaction injection molded (RIM) resins, and in one aspect, is more particularly related to methods and compositions for modifying the reactivity of RIM resins without modifying their cure rate.

BACKGROUND OF THE INVENTION

The preparation of reaction injection molded (RIM) elastomers such as non-cellular, rigid polyisocyanurate products is known and has become popular for the preparation of automobile body parts and other applications. Generally, the commercial RIM machines are of the two stream variety to prepare the reacted products, however three, four or more reactive streams may be employed. The preparation of polyisocyanurate resins using a wide variety of trimerization catalysts is also known.

Rigid non-cellular RIM compositions from polyether polyols, isocyanates and organic carbonates are known using various modifiers and catalysts. The preparation of laminated composites is also well known and the laminates may contain such materials as metal, wood or other cellulosic material, plastic, glass, or ceramics. These resins may also be filled with fibers of these materials to add structural strength.

These reinforced resin components, also called structural RIM or SRIM, are also used in the automotive industry as substances to replace metal. ARSET® HI 2801 and ARSET HT 3500 resins are used to give polymers with high elongation, according to U. E. Younes, "Resins Resist Impact: Versatile SRIM Composites," *Urethanes Technology*, June/July 1990, pp. 20–23. RIM compositions using these resins which contain a soluble adduct of a tertiary amine and a cyclic alkylene carbonate as a catalyst are described in U.S. Pat. Nos. 4,709,002; 4,731,427; 4,757,123; 4,800,058; 4,879,164; and 4,886,700.

The advantages of ARSET formulations include quick cure rates at room temperature coupled with low viscosity. These properties are particularly important when molding large RIM parts. The low viscosity of the system translates to effective wetting of glass reinforcements. The low viscosity components can easily penetrate the glass mats, allowing for higher glass loadings, which impart better performance properties. The fast reactivity signifies that the material has sufficient time to flow into the mold, but at the onset of the isocyanurate reaction, the cure rate is very fast. This, in turn, permits quick demold of parts and high production rates.

The reaction rates of these polyurethane systems are dependent upon the amount of catalyst. However, a practical limit is reached at the amount of catalyst required to give the desired cure rate and polymer properties. It is important that the mold be filled completely before cure begins. In many cases for large RIM parts, it is desirable to increase the set time to facilitate mold filling, while at the same time not affecting the cure rate adversely. Too long of a delay, however, can result in undesirably long total mold times.

As will be explained, the invention herein involves the careful use of amino acid salt catalysts having the formula:

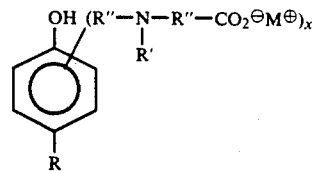

where R and R' are independently hydrogen or alkyl having 1 to 12 carbon atoms; where R" are independently alkylene groups having from 1 to 4 carbon atoms; where M is an alkali metal; and where x ranges from 1 to 2.

Amino acid salts of this group are known materials and are commercially available as part of a solution with diethylene glycol as CURITHANE® catalysts from Air Products and Chemicals, Inc. Curithane products may also posses acid-containing isocyanate catalysts. Indeed, the amino acid salt defined above is only known as a co-catalyst with other catalytic compounds, and then these co-catalyst combinations are only known for the trimerization of polyisocyanates to polyisocyanurates in rigid foam systems, not for use in non-cellular RIM systems. Representative patents describing these co-catalyst combinations for cellular rigid polyisocyanurate foams include U.S. Pat. Nos. 4,101,465; 3,896,052 and 4,011,180; 3,903,018 and 3,986,991. These patents are incorporated by reference herein for further details.

Additionally of interest is U.S. Pat. No. 3,580,868 which describes that synthetic resins, especially cellular foams, may be prepared by the polymerization of compounds which contain more than one isocyanate group in the molecule, in the presence of Mannich base catalysts which are obtained by reaction between dimethylamine, formaldehyde and phenols which contain in the molecule at least one organic substituent which has at least 6 carbon atoms. Less than equivalent quantities of compounds which contain active hydrogen atoms and the usual auxiliary agents may be optionally present. Also by way of general background in this area is Y. Imai, et al., "Trimerization Catalysts for Isocyanurate Foams," *European Journal of Cellular Plastics*, October 1980, pp. 126–133, which decribes various catalysts suitable for isocyanurate foams, but not for non-cellular RIM materials.

As noted, it would be an improvement in the art if the reactivity of the various RIM systems could be slowed without affecting the cure rate. This would permit the components to be completely injected into a large mold prior to the cure, though the cure rate itself would desirably remain quick. Such an improved system would maximize the production of quality RIM parts at high rates.

SUMMARY OF THE INVENTION

Accordingly, it is an object of the present invention to provide a reaction injection molded (RIM) composition having inhibited reactivity (increased set time).

It is another object of the present invention to provide a RIM system using catalysts that slow the reactivity of the system without appreciably delaying the cure of the system.

Still another object of the present invention is to provide a RIM composition that has reduced reactivity without appreciable decrease in the cure rate, yet which does not adversely affect the properties of the RIM product, and which is easy to implement.

In carrying out these and other objects of the invention, there is provided, in one form, a reaction injection molded (RIM) composition made by the process comprising reacting in a closed mold ingredients including, but not limited to, a polyol, a polyisocyanate, an isocyanurate catalyst such as an ammonium salt catalyst and an amino acid salt catalyst having the formula:

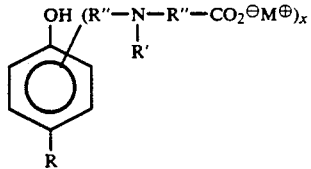

where R and R' are independently selected from the group consisting of hydrogen and alkyl having 1 to 12 carbon atoms; where R" are independently alkylene groups having from 1 to 4 carbon atoms; where M is an alkali metal; and where x ranges from 1 to 2.

DETAILED DESCRIPTION OF THE INVENTION

It has been discovered that rigid, non-cellular, reaction injection molded (RIM) compositions, and particularly structural RIM compositions (SRIM), may be advantageously made by the use of amino acid salts as a co-catalyst together with conventional isocyanurate catalysts.

The invention is also suitable for use in reinforced RIM (RRIM) where the RIM resin is filled with powders. The RIM systems of the invention may or may not be reinforced with fibers (such as glass, carbon or Kevlar TM aromatic polyamide fibers of E. I. DuPont deNemours & Company) and may be processed by conventional RIM equipment which is designed to handle fibers and other fillers. In addition to processing by RIM equipment, these polymers can be formed by cast molding techniques, where the liquid resin is placed into a mold and allowed to cure.

A wide variety of organic isocyanates including aliphatic, alicyclic and aromatic polyisocyanates may be employed in the instant invention and are characterized by containing two or more isocyanate (NCO) groups per molecule. Typical organic di- or polyisocyanates include p-phenylene diisocyanate; polymethylene polyphenyl isocyanate; toluene-2,4- and 2,6-diisocyanate or mixtures thereof; diansidine diisocyanate; hexamethylene diisocyanate; naphthalene-1,4-diisocyanate; naphthalene-1,4-diisocyanate; octylene-1,8-diisocyanate; 4,4'-diphenylpropane diisocyanate; 3,3'-dimethyl diphenylmethane-4,4'-diisocyanate; triphenylmethane triisocyanate; 3,3'-ditolylene-4,4'-diisocyanate; 4-chloro-1,3-phenylene diisocyanate; 1,4-, 1,3- and 1,2-cyclohexylene diisocyanate and in general the isocyanates disclosed in U.S. Pat. No. 3,577,358, incorporated by reference herein. Mixtures of polyisocyanates may be used which for example are the crude mixtures of di- and higher functional polyisocyanates produced by phosgenation of aniline-formaldehyde condensates or as prepared by the thermal decomposition of the corresponding carbamates dissolved in a suitable solvent as described in U.S. Pat. Nos. 3,962,302 and 3,919,279, both known as crude MDI or PMDI. The organic polyisocyanates may be isocyanate-terminated prepolymers made by reacting under standard known conditions, an excess of a polyisocyanate with a polyol which on a polyisocyanate to polyol basis may range from about 20:1 to 2:1 and include, for example, polyethylene glycol, polypropylene glycol, triethylene glycol, etc. as well as glycols or polyglycols partially esterified with carboxylic acids including polyester polyols and polyether polyols. Known processes for the preparation of polyamines and corresponding methylene-bridged polyphenyl polyisocyanates therefrom are disclosed in the literature and in many patents; for example U.S. Pat. Nos. 2,683,730; 2,950,263; 3,012,008; 3,334,162 and 3,362,979. The isocyanates may contain impurities or additives such as the carbodiimides or uretoimine modified MDI products. The preferred polyisocyanates are the diphenylmethane diisocyanate 4,4' isomers which may include the 2,4'-isomer and the higher functional polyisocyanate polymethylene polyphenyl isocyanate mixtures, which may contain from about 20 to about 85 wt. % of the diphenylmethane diisocyanate isomers. In general, the organic isocyanates will have a molecular weight in the range of between about 100 and about 10,000. Typical of the preferred polyisocyanates are those sold commercially as "Isonate 143-L" and "Isonate 181" by Dow Chemical Co.; carbodiimide modified diphenylmethane diisocyanates and ethylene glycol capped isocyanate prepolymer having 22.9% NCO respectively, and similar diisocyanates. The amount of isocyanate employed in the RIM process will be from about 95 to about 50 and preferably from about 80 to about 65 parts by weight (pbw) based on the isocyanate-polyol ingredients in the reaction mixture.

Co-catalysts employed in the instant invention for formation of the polyurethane modified polyisocyanurate polymer are trimerization catalysts and may be soluble complex adducts of a reaction of a tertiary amine and organic carbonates as described further below. A preferred catalyst is an adduct of triethylenediamine and propylene carbonate and their carbonate salts.

The organic carbonates which may be used in conjunction with these types of catalysts include acyclic dialkyl carbonates such as dimethyl carbonate and diethyl carbonate as well as, more preferably, cyclic alkylene carbonates such as those of the formula:

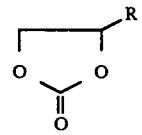

where R is hydrogen, $CH_3$, $C_2H_5$ or $C_3$ to $C_{10}$ hydrocarbons. Typical cyclic alkylene carbonates include but are not limited to, for example, ethylene carbonate, propylene carbonate, butylene carbonate, styrene carbonate and octylene carbonate, mixtures thereof and the like. Liquid alkylene carbonates are preferred, however solid or semi-solid carbonates may be used if liquified with other liquid alkylene carbonates or by the reaction temperature at which they are employed. Propylene carbonate is the preferred cyclic alkylene carbonate. Some of the alkylene carbonate may also be added, in the RIM injection process, along with and mixed with the isocyanate in order to reduce viscosity.

The tertiary amines which may be employed to form the complex adduct catalysts include, for example, N-methyl morpholine; N-ethyl morpholine; dimethylaminocyclohexane; triethylenediamine; bis-(dimethylaminoethyl)ether; dimethylethanolamine; 1,4-dimethylpiperazine; trimethylaminopropylethanolamine; trimethylhydroxyethyl ethylenediamine, N,N,N',N'-tetramethyl ethylene diamine and the like. More information about these soluble carbonate/amine adduct catalysts may be found in U.S. Pat. Nos. 4,709,002; 4,731,427; 4,757,123; 4,800,058; 4,879,164; and 4,886,700, incorporated by reference herein.

Other specific co-catalysts suitable for the RIM compositions of the invention are conventional isocyanurate catalysts, which include, but are not limited to hydroxyalkyl trialkyl ammonium carbonate salts of the formula:

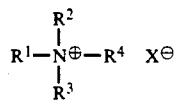

where $R^1$, $R^2$, $R^3$ are alkyl groups of 1 to 12 carbon atoms; $R^4$ is a hydroxyalkyl of 2 to 12 carbon atoms, and $X-$ is an organic carboxylate of 1 to 20 carbon atoms. These co-catalysts should be present in the range from about 0.2 to about 2.0 weight percent based on the RIM total composition, preferably from about 0.4 to about 1.2 wt. %. The salt may be prepared by reacting a teriary amine, an organic acid and an alkylene oxide as described, for example, in U.S. Pat. Nos. 3,010,963 and 4,101,465, incorporated by reference herein. Suitable ammonium salt co-catalysts include those made from trimethylamine, propylene oxide and octoate salts. See also the list of exemplary salts in column 5 of U.S. Pat. No. 4,101,465.

In the inventive RIM systems of this invention some of the catalyst portion is an amino acid salt catalyst having the formula:

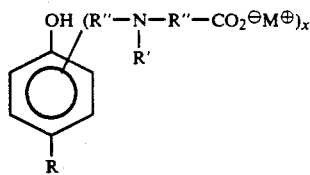

where R and R' are independently selected from the group consisting of hydrogen and alkyl having 1 to 12 carbon atoms; where R" are independently alkylene groups having from 1 to 4 carbon atoms; where M is an alkali metal; and where x ranges from 1 to 3. In a preferred aspect of the catalyst, R is an alkyl group of 9 to 12 carbon atoms, R' is an alkyl group having from 1 to 4 carbon atoms, both R" groups are methylene and x is 1. In another preferred embodiment, the alkali metal, M, is sodium and the parenthetical expression denoted by x is in one or both of the ortho positions.

Suitable amino acid salts include, but are not limited to:

sodium N-(2-hydroxy-5-methylphenyl)methyl-N-methyl glycinate;

sodium N-(2-hydroxy-5-ethylphenyl)methyl-N-methyl glycinate;

sodium N-(2-hydroxy-5-butylphenyl)methyl-N-methyl glycinate;

sodium N-(2-hydroxy-5-heptylphenyl)methyl-N-methyl glycinate;

sodium N-(2-hydroxy-5-nonylphenyl)methyl-N-methyl glycinate;

sodium N-(2-hydroxy-5-dodecylphenyl)methyl-N-methyl glycinate;

potassium N-(2-hydroxy-5-nonylphenyl)methyl-N-methyl glycinate;

lithium N-(2-hydroxy-5-nonylphenyl)methyl-N-methyl glycinate;

disodium salt of 2,6-bis-(N-carboxymethyl-N-methylaminomethyl)-p-ethylphenol; disodium salt of 2,6-bis-(N-carboxymethyl-N-methylaminomethyl)-p-nonylphenol; and mixtures thereof.

The amino acid salt catalyst is typically employed in the RIM formulation in amounts of from about 0.1 to about 4.0 percent, and preferably from about 0.2 to about 2.0 percent, based on the total composition. At least an effective amount of the amino acid salt should be present. By an "effective amount" is meant a sufficient quantity to permit filling a mold prior to the onset of cure; or in other words, enough to reduce the reactivity of the system as compared with such system without the amino acid salt catalyst present. At least 0.2%, based on the total RIM system, is needed to effectively slow the reactivity.

The polyether polyols or mixtures of polyether polyols suitable in the present invention include those having from 2 to about 10 hydroxyl groups. Such polyether polyols and methods for their preparation are described in *Polyurethanes: Chemistry and Technology*, by Saunders and Frisch, Interscience Publishers, 1964. Particularly suitable polyether polyols include those having molecular weights of from about 200 to about 10,000 or higher and preferably molecular weights of from about 400 to about 8000 and prepared by reacting an initiator compound having 2 to about 8 hydroxyl groups with an alkylene oxide or mixture of such oxides. Suitable initiator compounds include, for example, ethylene glycol; propylene glycol; water; dipropylene glycol; trimethylene glycol; 1,2-, 1,3 and 1,4-butanediol; glycerol; 1,2,6-hexanetriol; trimethylolethane; trimethylolpropane; pentaerythritol; sorbitol; sucrose and the like. The alkylene oxides suitable for use include ethylene oxide; propylene oxide; 1,2- and 2,3-butylene oxide; styrene oxide; epichlorohydrin; epibromohydrin and mixtures thereof, etc. The polyether polyols may be diols, triols or a higher functionality polyol, as well as capped diols or triols or mixtures thereof. Amine or hydroxyl terminated polybutadiene may also be employed. Chain extenders or mixtures thereof may also be employed along with the polyether polyols in the total formulation. Such chain extenders include mixtures of difunctional and trifunctional chain extenders. Typical known chain extenders which may be used include diols, amino alcohols and diamines or mixtures thereof.

It is anticipated further that various polymer polyols will find utility as coreactants with polyisocyanates in the presence of a suitable catalyst to produce the RIM materials of the present invention. Generally, the RIM materials are cured at temperatures in the range of 40 to 95° C.

Although not essential to the practice of the invention, the use of commonly known additives which may enhance color or properties of the polyurethane modified polyisocyanurate polymer or other RIM or SRIM compositions may be used if desired. For example, reinforcing materials which may be in a powder, granular, long fiber or mixed form, such as chopped or milled glass fibers, chopped or milled carbon fibers, silicon fibers, synthetic fibers such as nylon or Kevlar, polyethylene or polypropylene fibers or strands, natural fibers of wool or cotton, cellulosic fibers, etc. may be used in SRIM composites. Woven or non-woven mats of the fibers may be employed in a laminate fashion.

The polyisocyanurate RIM compositions, modified or not with polyurethane, are essentially non-cellular. However, due to small amounts of water which may be present in the reaction components, i.e., polyols, alkylene carbonate, catalyst, etc., the composition may contain small cells or microcells in the polymer.

Although excellent mold release is obtained with the RIM formulation of the instant invention alone, external or internal mold release agents such as, for example, the dimethyl siloxanes with organic acid groups may be employed.

As noted, the present invention provides a method for slowing down the reactivity of the quatenary ammonium catalyst systems without altering the cure rate. This implies that the amount of time available for flowability, mold filling, and glass wetting is increased while the time required to set and demold is essentially the same. The ability to control the reactivity without affecting the physical properties will allow larger molds to be filled and demolded efficiently with no loss of physical properties.

The invention has been demonstrated in the laboratory. The following are examples of adding small amounts of Curithane 52 to the systems using quaternary salts formed by the reaction of an amine and propylene carbonate. It is unclear at this time exactly why these amino acid salts decrease the reactivity of the system without retarding the cure rate. It is hypothesized that what might happen is that the acidic components in the Curithane blend slow down the reactivity, while an isocyanurate catalyst component aids in the set rate. However, the examples or this hypothetical explanation are not to be construed as limiting the invention in any way. It will be recalled that the Curithane catalyst blends are not expected to be useful to decrease the reaction rate in RIM or SRIM systems such as these, but rather were designed to accelerate the rate of formation of rigid polyisocyanurate cellular foams.

EXAMPLES 1-5

The following Examples describe the preparation of a cast RIM molding composition of ARSET® HI 2801 resin with varying levels of Curithane 52. The following components were mixed for 10 seconds at room temperature: 100 g. of ARSET HI 2801-B polyol resin, 150.0 g. of ARSET HI 2801-A isocyanate, and the indicated proportions of Curithane. The mixture was poured into a room temperature aluminum mold with the dimensions of 12"×12"×½". The mold was held together with C clamps after the liquid was poured into it. After one minute, the mold was opened and the plaques removed. The set times, which are a measure of reactivity or pot life, are shown in Table I below.

TABLE I

| Use of Amino Acid Salts in RIM | | | | | |
|---|---|---|---|---|---|
| | Example | | | | |
| | 1 | 2 | 3 | 4 | 5 |
| ARSET HI 2801-B | 100.0 | 100.0 | 100.0 | 100.0 | 100.0 |
| Curithane 52 | — | 0.1 | 0.3 | 0.5 | 0.7 |
| ARSET HI 2801-A | 150.0 | 150.0 | 150.0 | 150.0 | 150.0 |
| Set time, sec. | 20 | 42 | 42 | 40 | 35 |

It may be seen that the addition of 0.3% Curithane 52 per 100 parts of the polyol resin effectively increased the set time from 20 seconds to 42 seconds in hand mixed parts. It should be noted that the addition of increased amounts of Curithane 52 begin to have a catalytic effect on the isocyanurate reaction. At some concentration, it would be expected that the reactivity rates of the two systems would be the same. It should be noted that the increased set time is essentially constant over a catalyst range of 0.1 to 0.5 pbw per 100 pbw polyol. It should also be noted that at 0.1% Curithane 52 (Example 2), the set time was similarly increased; however, there was a noticeable delay in cure rate of the system, which may cause an undesirable increase in demold time. For this level of ammonium salt, 0.1 parts of Curithane 52 is not the optimum level. It may be suitable for other amounts of ammonium salt.

EXAMPLES 6-9

The systems described in Examples 6 through 9 use Dabco TMR as the isocyanurate catalyst. Dabco TMR is a hydroxylalkyl trialkyl ammonium carbonate salt-based catalyst sold by Air Products and Chemicals, Inc. The addition of 0.3% Curithane 52 in these Examples effectively delays the set time from 20 to 30 seconds. The procedure by which these samples were prepared is the same as that defined in Examples 1 through 5. The delay in reactivity with increasing amino acid salt proportion is shown in Table II.

TABLE II

| Use of Amino Acid Salts in TMR-Catalyzed RIM Systems | | | | |
|---|---|---|---|---|
| | Example | | | |
| | 6 | 7 | 8 | 9 |
| ARSET HI 2801-A | 150.0 | 150.0 | 150.00 | 150.0 |
| ARSET HI 2801-B, w/o tertiary amine/carbonate adduct catalyst | 100.0 | 100.0 | 100.0 | 100.0 |
| Dabco TMR | 1.5 | 1.5 | 1.5 | 1.5 |
| Curithane 52 | — | 0.3 | 0.55 | 1.0 |
| Set time, seconds | 20 | 30 | 30 | 25 |

EXAMPLES 10-12

These Examples were conducted to demonstrate the feasibility of this invention under molding conditions typical of commercial SRIM operations. Examples 10-12 combine the effect of elevated mold temperature and elevated component temperatures. The procedure used was that of Examples 1-5. The results are shown in Table III.

TABLE III

| Combined Effect of Mold Temperature and Component Temperature on Set Time Using Amino Acid Salts | | | |
|---|---|---|---|
| | Example | | |
| | 10 | 11 | 12 |
| ARSET HI 2801-A | 150 | 150 | 150 |
| ARSET HI 2801-B | 100 | 100 | — |
| ARSET HI 2801-B, w/reduced | — | — | 100 |

TABLE III-continued
Combined Effect of Mold Temperature and Component Temperature on Set Time Using Amino Acid Salts

| | Example | | |
|---|---|---|---|
| | 10 | 11 | 12 |
| tertiary amine/carbonate adduct catalyst | | | |
| Curithane 52 | 0 | 0.7 | 0.7 |
| Set time, seconds | 21 | 27 | 66 |
| Mold temperature, °C. | 75 | 75 | 75 |
| Isocyanate temp., °C. | 30 | 30 | 30 |
| Polyol resin temp., °C. | 30 | 30 | 30 |

EXAMPLES 13-15

These Examples were also conducted to demonstrate the effect of Curithane 52 on the set time of parts metered, mixed and dispensed by a high pressure RIM machine. A Krauss-Maffei RIM Star 40 machine was used to mold plaques. The polyol resin and isocyanate were mixed and dispensed onto a heated mold surface. The delayed set time is evident, as shown in earlier examples.

TABLE IV
Effect of Machine Molding Conditions on Set Times Using Amino Acid Salts

| | Example | | |
|---|---|---|---|
| | 13 | 14 | 15 |
| ARSET HI 2801-A | 150.0 | 150.0 | 150.0 |
| ARSET HI 2801-B, w/ reduced tertiary amine/-carbonate catalyst | 100.0 | 100.0 | 100.0 |
| Curithane 52 | 0 | 0.35 | 0.70 |
| Mold Temperature | 70° C. | 70° C. | 70° C. |
| Set Time, seconds | 22 sec. | 55 sec. | 40 sec. |

It has also been determined that in some systems, the amino acid salt catalyst may be employed as the only catalyst present.

Many modifications may be made in the SRIM and RIM compositions of this invention and their method of production without departing from the spirit and scope of the invention, which are defined only in the appended claims. For example, one skilled in the art could adjust the specific amino acid salt or combination thereof, catalyst combinations, proportions and modes of addition within the parameters set forth to provide resins with particularly advantageous properties.

GLOSSARY

| | |
|---|---|
| ARSET ® HI2801A Isocyanate | A polymethylene polyphenylisocyanate having a specific gravity of 1.22, a viscosity of 60 cP at 25° C., and an NCO content of about 32%, available from ARCO Chemical Company. |
| ARSET ® HI2801B Polyol | A blend of propylene carbonate, polyether polyols, chain extender and tertiary amine/carbonate adduct catalyst available from ARCO Chemical Company. |
| Curithane ® 52 | A 50% amino acid salt solution in diethylene glycol, sold by Air Products and Chemicals, Inc. The amino acid salt is sodium N-(2-hydroxy-5-nonylphenyl)methyl-N-methyl glycinate. |
| DABCO TMR | A hydroxyalkyl trialkyl ammonium carboxylate salt-based catalyst sold by Air Products and Chemicals, Inc. |

We claim:

1. A non-cellular reaction injection molded (RIM) composition made by the process comprising reacting in a closed mold ingredients comprising
   a polyol;
   a polyisocyanate;
   a catalyst system consisting of:
      an ammonium salt isocyanurate catalyst; and
      an amino acid salt catalyst having the formula:

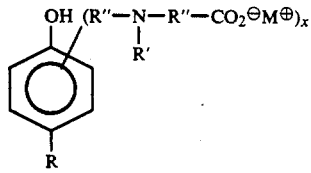

where R and R' are independently selected from the group consisting of hydrogen and alkyl having 1 to 12 carbon atoms;
where R" are independently alkylene groups having from 1 to 4 carbon atoms;
where M is an alkali metal; and
where x ranges from 1 to 2 to produce a non-cellular RIM composition.

2. The RIM composition of claim 1 where in the amino acid salt catalyst, R is an alkyl group having from 9 to 12 carbon atoms, R' is an alkyl group having from 1 to 4 carbon atoms, R" is methylene, and x is 1.

3. The RIM composition of claim 1 where the amount of amino acid salt catalyst ranges from about 0.1 to about 4.0 percent, and the amount of ammonium salt catalyst ranges from about 0.2 to about 2.0 weight percent.

4. The RIM composition of claim 1 where the ammonium salt isocyanurate catalyst is a hydroxyalkyl trialkyl ammonium carboxylate salt, in the absence of an additional catalyst besides said hydroxyalkyl trialkyl ammonium carboxylate salt and said amino acid salt.

5. The RIM composition of claim 1 where the ammonium salt isocyanurate catalyst is a soluble adduct of tertiary amine and organic carbonate.

6. The RIM composition of claim 1 where the amount of amino acid salt catalyst ranges from about 0.1 to about 4.0 percent, and where the ammonium salt isocyanurate catalyst is a soluble adduct of tertiary amine and cyclic alkylene carbonate present in an amount ranging from about 0.01 to about 5 weight percent.

7. The RIM composition of claim 1 where the ammonium salt isocyanurate catalyst is a hydroxyalkyl trialkyl ammonium carboxylate salt having the formula:

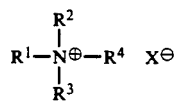

where $R^1$, $R^2$, $R^3$ are alkyl groups of 1 to 12 carbon atoms; $R^4$ is a hydroxyalkyl of 2 to 12 carbon atoms, and X— is an organic carboxylate of 1 to 20 carbon atoms, in the absence of an additional catalyst besides said hydroxyalkyl trialkyl ammonium carboxylate salt and said amino acid salt.

8. The RIM composition of claim 1 where the ammonium salt isocyanurate catalyst is a soluble adduct of a tertiary amine and propylene carbonate, where the tertiary amine is selected from the group consisting of N-methyl morpholine; N-ethyl morpholine; dimethylaminocyclohexane; triethylenediamine; bis-(dimethylaminoethyl)ether; dimethylethanolamine; 1,4-dimethylpiperazine; trimethylaminopropylethanolamine; trimethylhydroxyethyl ethylenediamine, N,N,N',N'-tetramethyl ethylene diamine and mixtures thereof.

9. A non-cellular reaction injection molded (RIM) composition made by the process comprising reacting in a closed mold ingredients comprising
   a polyol;
   a polyisocyanate;
   a catalyst system consisting of:
      an ammonium salt isocyanurate catalyst; and
      an effective amount of an amino acid salt catalyst having the formula:

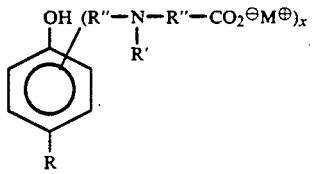

where R is an alkyl having 9 to 12 carbon atoms;
   where R' is an alkyl group having from 1 to 4 carbon atoms;
   where both R" groups are independently methylene;
   where M is an alkali metal; and
   where x is 1; and
where the amount of amino acid salt catalyst ranges from about 0.1 to about 4.0 percent, and where a non-cellular RIM composition is produced.

10. The RIM composition of claim 9 where the ammonium salt isocyanurate catalyst is a hydroxyalkyl trialkyl ammonium carboxylate salt, in the absence of an additional catalyst besides said hydroxyalkyl trialkyl ammonium carboxylate salt and said amino acid salt.

11. The RIM composition of claim 9 where the ammonium salt isocyanurate catalyst is a soluble adduct of tertiary amine and organic carbonate.

12. The RIM composition of claim 9 where the ammonium salt isocyanurate catalyst is a soluble adduct of tertiary amine and cyclic alkylene carbonate present in an amount ranging from about 0.01 to about 5 weight percent.

13. The RIM composition of claim 7 where the ammonium salt isocyanurate catalyst is a hydroxyalkyl trialkyl ammonium carboxylate salt having the formula:

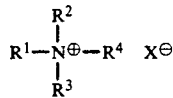

where $R^1$, $R^2$, $R^3$ are alkyl groups of 1 to 12 carbon atoms; $R^4$ is a hydroxyalkyl of 2 to 12 carbon atoms, and X— is an organic carboxylate of 1 to 20 carbon atoms, in the absence of an additional catalyst besides said hydroxyalkyl trialkyl ammonium carboxylate salt and said amino acid salt.

14. The RIM composition of claim 9 where the ammonium salt isocyanurate catalyst is a soluble adduct of a tertiary amine and propylene carbonate, where the tertiary amine is selected from the group consisting of N-methyl morpholine; N-ethyl morpholine; dimethylaminocyclohexane; triethylenediamine; bis-(dimethylaminoethyl)ether; dimethylethanolamine; 1,4-dimethylpiperazine; trimethylaminopropylethanolamine; trimethylhydroxyethyl ethylenediamine, N,N,N',N'-tetramethyl ethylene diamine and mixtures thereof.

15. In a process for producing a non-cellular reaction injection molded (RIM) composition having a reactivity and a cure rate, comprising reacting in a closed mold ingredients comprising
   a polyol;
   a polyisocyanate;
   a catalyst component consisting of an ammonium salt isocyanurate catalyst and an amino salt catalyst;
      where the improvement comprising slowing the reactivity of the ingredients without altering the cure rate of the ingredients, by having at least part of the catalyst be an amino acid salt catalyst having the formula:

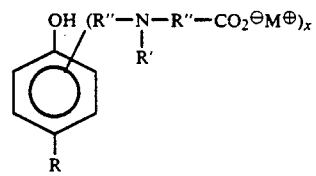

where R and R' are independently selected from the group consisting of hydrogen and alkyl having 1 to 12 carbon atoms;
   where R" are independently alkylene groups having from 1 to 4 carbon atoms;
   where M is an alkali metal; and
   where x ranges from 1 to 2;
to produce a non-cellular RIM composition.

16. The process of claim 15 where in the amino acid salt catalyst, R is an alkyl group having from 9 to 12 carbon atoms, R' is an alkyl group having from 1 to 4 carbon atoms, R" is methylene, and x is 1.

17. The process of claim 15 where the amount of amino acid salt catalyst ranges from about 0.1 to about 4.0 percent.

18. The process of claim 15 where the ammonium salt isocyanurate catalyst is a hydroxyalkyl trialkyl ammonium carboxylate salt, in the absence of an additional catalyst besides said hydroxyalkyl trialkyl ammonium carboxylate salt and said amino acid salt.

19. The process of claim 15 where the ammonium salt isocyanurate catalyst is a soluble adduct of tertiary amine and organic carbonate.

20. The process of claim 15 where the amount of amino acid salt catalyst ranges from about 0.1 to about 4.0 percent, and where the ammonium salt isocyanurate catalyst is a soluble adduct of tertiary amine and cyclic alkylene carbonate present in an amount ranging from about 0.01 to about 5 weight percent.

21. The process of claim 15 where the ammonium salt isocyanurate catalyst is a hydroxyalkyl trialkyl ammonium carboxylate salt having the formula:

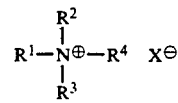

where $R^1$, $R^2$, $R^3$ are alkyl groups of 1 to 12 carbon atoms; $R^4$ is a hydroxyalkyl of 2 to 12 carbon atoms, and X— is an organic carboxylate of 1 to 20 carbon atoms, in the absence of an additional catalyst besides said hydroxyalkyl trialkyl ammonium carboxylate salt and said amino acid salt.

22. The process of claim 15 where the ammonium salt isocyanurate catalyst is a soluble adduct of a tertiary amine and propylene carbonate, where the tertiary amine is selected from the group consisting of N-methyl morpholine; N-ethyl morpholine; dimethylaminocyclohexane; triethylenediamine; bis-(dimethylaminoethyl)ether; dimethylethanolamine; 1,4-dimethylpiperazine; trimethylaminopropylethanolamine; trimethylhydroxyethyl ethylenediamine, N,N,N',N'-tetramethyl ethylene diamine and mixtures thereof.

23. In a process for producing a non-cellular reaction injection molded (RIM) composition having a reactivity and a cure rate, comprising reacting in a closed mold ingredients comprising
   a polyol;
   a polyisocyanate;
   a catalyst component consisting of an ammonium salt isocyanurate catalyst and an amino acid salt catalyst; where the improvement comprising slowing the reactivity of the ingredients without altering the cure rate of the ingredients, by having at least part of the catalyst be an effective amount of an amino acid salt catalyst having the formula:

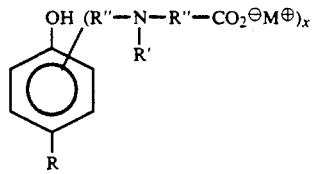

where R is an alkyl group having 9 to 12 carbon atoms;
   where R' is an alkyl group having from 1 to 4 carbon atoms;
   where both R" groups are methylene groups;
   where M is an alkali metal; and
   where x is 1; and where the amount of amino acid salt catalyst ranges from about 0.1 to about 4.0 percent; to produce a non-cellular RIM composition.

24. The process of claim 23 where the ammonium salt isocyanurate catalyst is a hydroxyalkyl trialkyl ammonium carboxylate salt, in the absence of an additional catalyst besides said hydroxyalkyl trialkyl ammonium carboxylate salt and said amino acid salt.

25. The process of claim 23 where the ammonium salt isocyanurate catalyst is a soluble adduct of tertiary amine and organic carbonate.

26. The process of claim 18 where the ammonium salt isocyanurate catalyst is a soluble adduct of tertiary amine and cyclic alkylene carbonate present in an amount ranging from about 0.01 to about 5 weight percent.

27. The process of claim 17 where the ammonium salt isocyanurate catalyst is a hydroxyalkyl trialkyl ammonium carboxylate salt having the formula:

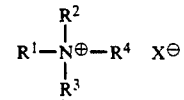

where $R^1$, $R^2$, $R^3$ are alkyl groups of 1 to 12 carbon atoms; $R^4$ is a hydroxyalkyl of 2 to 12 carbon atoms, and X— is an organic carboxylate of 1 to 20 carbon atoms, in the absence of an additional catalyst besides said hydroxyalkyl trialkyl ammonium carboxylate salt and said amino acid salt.

28. The process of claim 23 where the ammonium salt isocyanurate catalyst is a soluble adduct of a tertiary amine and propylene carbonate, where the tertiary amine is selected from the group consisting of N-methyl morpholine; N-ethyl morpholine; dimethylaminocyclohexane; triethylenediamine; bis-(dimethylaminoethyl)ether; dimethylethanolamine; 1,4-dimethylpiperazine; trimethylaminopropylethanolamine; trimethylhydroxyethyl ethylenediamine, N,N,N',N'-tetramethyl ethylene diamine and mixtures thereof.

* * * * *